United States Patent

[11] 3,607,874

| [72] | Inventors | Ernst Fuerst<br>Neustadt;<br>Herbert Toussaint, Frankenthal; Georg<br>Sold, Schifferstadt, all of Germany |
|---|---|---|
| [21] | Appl. No. | 777,886 |
| [22] | Filed | Nov. 21, 1968 |
| [45] | Patented | Sept. 21, 1971 |
| [73] | Assignee | Badische Anilin- & Soda-Fabrik<br>Aktiengesellschaft<br>Ludwigshafen/Rhine, Germany |
| [32] | Priority | Nov. 24, 1967 |
| [33] | | Germany |
| [31] | | P 16 70 288.8 |

[54] PRODUCTION OF N-METHYLPIPERAZINE
7 Claims, No Drawings

| [52] | U.S. Cl. | 260/268 SY, 260/268 R |
|---|---|---|
| [51] | Int. Cl. | C07d 51/66 |
| [50] | Field of Search | 260/268, 268 SY, 268 C |

[56] References Cited

UNITED STATES PATENTS

| 2,639,284 | 5/1953 | Morran | 260/268 |
|---|---|---|---|
| 2,905,673 | 9/1959 | Moss | 260/268 |
| 2,919,275 | 12/1959 | Bond | 260/268 |
| 3,069,331 | 12/1962 | Myerly | 260/268 X |
| 3,249,613 | 4/1966 | Burns et al. | 260/268 |
| 3,373,161 | 3/1968 | Bereger et al. | 260/268 |

*Primary Examiner*—Donald G. Daus
*Attorney*—Johnston, Root, O'Keeffe, Keil, Thompson & Shurtleff ABSTRACT: Production of N-methylpiperazine by reaction of aqueous formaldehyde solution with piperazine followed by hydrogenation of the polymethylenepiperazine formed in the presence of known hydrogenation catalysts at superatmospheric pressure and elevated temperature, the reaction being carried out in the presence of acetic acid or piperazine acetate and the N,N'-dimethylpiperazine formed during the hydrogenation being distilled off as an azeotrope with water. N-methylpiperazine is used as a selective solvent for the extraction of aromatics from hydrocarbon mixtures.

PRODUCTION OF N-METHYLPIPERAZINE

This invention relates to an improved process for the production of N-methylpiperazine from piperazine.

It is known that N-methylpiperazine is obtained by reaction of N-formylpiperazine with formic acid and formaldehyde followed by separation and hydrolysis of the N-methyl-N'-formylpiperazine formed. This process is expensive however because N-formylpiperazine has to be used as the starting material. It is also known from U.S. Pat. No. 2,639,284 that N-methylpiperazine is obtained by hydrogenation of polymethylenepiperazine (prepared from piperazine and formaldehyde) followed by isolation by way of its carbon disulfide addition compound. This process has the disadvantage that the suspension of N-polymethylene piperazine is difficult to handle and to pump because of its viscosity. Moreover isolation of N-methylpiperazine by way of its carbon disulfide adduct is expensive.

It is an object of this invention to provide an improved process for the production of N-methylpiperazine in which only a small amount of byproducts is formed and piperazine is used as an aqueous solution. It is a further object of the invention to provide a process in which the suspension of polymethylenepiperazine is easy to handle. Another object of the invention is to provide a process in which the isolation of N-methylpiperazine is easier to carry out than hitherto.

In accordance with this invention these and other objects and advantages are achieved in an improved process for the production of N-methylpiperazine by reaction of piperazine with aqueous formaldehyde solution followed by hydrogenation of the polymethylenepiperazine formed in the presence of a known hydrogenation catalyst at elevated temperature and superatmospheric pressure, in which the improvement consists in carrying out the reaction in the presence of acetic acid or piperazine acetate and after the hydrogenation distilling off the N,N'-dimethylpiperazine from the reaction mixture as an azeotrope with water.

It is preferred to use concentrated aqueous solutions, for example from 30 percent to 40 percent by weight solutions, of formaldehyde. The piperazine does not have to be used in pure form. It may also be used in the form of an aqueous solution, for example an aqueous solution having a strength of more than 50 percent. It is advantageous to use 1 mole of formaldehyde to 1 mole of piperazine. It is also possible to use one or other component in a slight excess, for example up to 0.2 mole percent. The reaction is carried out for example at a temperature of from 10° to 100° C., particularly from 50° to 90° C.

An essential feature of the invention is carrying out the reaction in the presence of acetic acid or the acetate of piperazine. It is advantageous to use 0.05 to 0.5, particularly from 0.1 to 0.3, mole of acetic acid as such or in the form of its salt with piperazine to 1 mole of piperazine. Piperazine acetate may be added as such to the starting material or the polymethylenepiperazine or may be formed from the starting materials during the reaction. It is also possible to add acetic acid or piperazine acetate to the polymethylenepiperazine already formed.

Hydrogenation of the polymethylenepiperazine formed is carried out in the presence of known catalysts such as cobalt, nickel, copper, chromium or manganese. Hydrogenation catalysts containing cobalt and/or nickel have proved to be particularly suitable, The metal of the catalysts may be granular or finely divided as such or may be applied to carriers such as silicic acid, silica gel, alumina or active carbon. The catalysts are prepared for example from the corresponding oxides or compounds of the metals such as oxalates, formates, carbonates or ammoniates (which change into the oxides when heated) by treatment with hydrogen at elevated temperature. It is advantageous to carry out the hydrogenation at a temperature of from 60° to 140° C., particularly from 80° to 130° C. Good results are obtained when pressures of from 120 to 300 atmospheres, particularly from 200 to 300 atmospheres are used. It is advantageous to use 0.01 to 2 parts of hydrogenation catalyst to each part of piperazine.

Another essential feature of the invention is that the N,N'-dimethylpiperazine contained in the reaction mixture after the hydrogenation is distilled as an azeotrope with water, advantageously after the hydrogenation catalyst has been removed. The azeotrope consists of 50 percent by weight of water and 50 percent by weight of N,N'-dimethylpiperazine and boils at from 95° to 98° C. Pure N-methylpiperazine is obtained from the residual solution by distillation.

The process according to this invention may be carried out for example by mixing aqueous formaldehyde solution and piperazine in the specified ratio in a reactor and adding the specified amount of acetic acid or piperazine acetate. The reaction is carried out at the temperature specified. It is generally over after from 10 minutes to 2 hours. The resultant suspension of polymethylenepiperazine is then pumped into a high-pressure vessel and the said amount of catalyst is added, the hydrogenation then being carried out under the said conditions, The catalyst obtained in the resultant reaction mixture is advantageously separated by known methods, for example by filtration or decantation. An amount of caustic alkali solution equivalent to the amount of acetic acid used is then preferably added; caustic soda solution may be used. It is advantageous to add to the reaction mixture a hydrocarbon, alcohol or ether which boils at a temperature about 10° C. higher and to distil off the N,N'-dimethylpiperazine as an azeotrope with water at 95° C. Pure N-methylpiperazine is obtained from the residue at 136° C. Excess piperazine distils at 140° C. This is reused as starting material.

The N-methylpiperazine prepared according to the process of the invention is suitable for the production of surfactants and as a selective solvent for the extraction of aromatics from hydrocarbon mixtures.

The invention is illustrated by the following example. The parts specified are by weight.

EXAMPLE 29 parts of piperazine acetate is added to 144 parts of a 60 percent by weight aqueous solution of piperazine and then within 15 minutes 100 parts of a 30 percent by weight aqueous solution of formaldehyde is allowed to flow in at from 50° to 70° C. The whole is mixed well during the reaction. The reaction mixture is then diluted with 200 parts of water. The suspension formed has a viscosity of 309 centipoises at 20° C. 0.086 part of Raney cobalt is added to the reaction mixture which is then transferred to an autoclave and reduced therein within 3 hours at 100° C. and 280 atmospheres of hydrogen. Cobalt is filtered off from the reduced reaction mixture and 60 parts of triglycol and 32 parts of 50 percent by weight aqueous caustic soda solution are added to the reaction mixture which is then subjected to fractional distillation. An azeotrope of water and N,N'-dimethylpiperazine distils off at 95° C. Then N-methylpiperazine passes over at 136° C. in a purity of 99.3 percent; piperazine which boils at 140° C. is returned for reuse as starting material.

COMPARATIVE EXAMPLE

The procedure described in example 1 is followed but no piperazine acetate is added. A suspension of polymethylenepiperazine in water is obtained which has a viscosity of 415 centipoises at 20° C.

We claim:

1. In a process for the production of N-methylpiperazine by reacting an aqueous formaldehyde solution with piperazine at a temperature of from 10° to 100° C. and contacting the resultant polymethylenepiperazine with hydrogen at a temperature of from 60° to 140° C. and a pressure of from 120 to 300 atmospheres in the presence of nickel, cobalt, copper, chromium or manganese as hydrogenation catalysts followed by treatment with aqueous alkali solution and removal of the N,N'-dimethylpiperazine from the reaction mixture as an azeotrope with water, the improvement which comprises adding to the starting materials or to the polymethylenepiperazine from 0.05 to 0.5 mole of acetic acid or piperazine acetate.

2. A process as claimed in claim 1 wherein piperazine and formaldehyde are used in the molar ratio.

3. A process as claimed in claim 1 in which reaction of piperazine and aqueous formaldehyde solution is carried out at a temperature of from 50° to 90° C.

4. A process as claimed in claim 1 wherein 0.1 to 0.3 mole of acetic acid or piperazine acetate is used for each mole of piperazine.

5. A process as claimed in claim 1 wherein acetic acid or piperazine acetate is added to the polymethylenepiperazine formed.

6. A process as claimed in claim 1 wherein hydrogenation of the polymethylenepiperazine is carried out at from 80° to 130° C.

7. A process as claimed in claim 1 wherein hydrogenation is carried out at a pressure of from 200 to 300 atmospheres.